(12) United States Patent
Tate et al.

(10) Patent No.: US 6,396,932 B1
(45) Date of Patent: *May 28, 2002

(54) PLUGGABLE NOISE-CONTROLLING APPARATUS AND METHOD

(75) Inventors: Joseph B. Tate, Sausalito; Steven B. Wolff, Woodgere; Vidya Sagar Rae, San Ramon, all of CA (US)

(73) Assignee: UmeVoice, Inc., Novato, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/358,506

(22) Filed: Jul. 21, 1999

(51) Int. Cl.$^7$ .............................. H04B 15/00; H04F 9/08
(52) U.S. Cl. ...................................... 381/94.1; 381/357
(58) Field of Search .................................. 381/94.1, 357

(56) References Cited

U.S. PATENT DOCUMENTS

| | | |
|---|---|---|
| D29,707 S | 11/1898 | Mulconroy |
| D135,303 S | 3/1943 | Scher |
| 2,851,544 A | 9/1958 | Wisdom |
| 3,231,688 A | 1/1966 | Ugartechea |
| D216,802 S | 3/1970 | Kliewer |
| 3,632,902 A | 1/1972 | Wahler |
| 4,001,893 A | 1/1977 | Yamamoto |
| 4,773,091 A | 9/1988 | Busche et al. |
| 4,823,384 A | 4/1989 | Lindsay |
| 4,850,016 A | 7/1989 | Groves et al. |
| D320,798 S | 10/1991 | Holt |
| 5,117,461 A | 5/1992 | Moseley |
| 5,182,774 A | 1/1993 | Bourk |
| 5,239,578 A | 8/1993 | Regen et al. |
| 5,268,965 A | 12/1993 | Badie et al. |
| 5,282,245 A | 1/1994 | Anderson |
| 5,329,593 A | 7/1994 | Lazzeroni et al. |
| 5,337,364 A | 8/1994 | Fitch |
| 5,341,420 A | 8/1994 | Hollier et al. |
| 5,343,523 A | 8/1994 | Bartlett et al. |
| 5,394,467 A | 2/1995 | Kepley, III et al. |
| 5,448,637 A | 9/1995 | Yamaguchi et al. |
| 5,491,747 A | 2/1996 | Bartlett et al. |
| 5,524,058 A | 6/1996 | Moseley |
| D396,235 S | 7/1998 | Tate et al. |
| 5,854,848 A * | 12/1998 | Tate et al. ................... 381/357 |
| 5,909,495 A * | 6/1999 | Andrea ........................ 381/67 |

FOREIGN PATENT DOCUMENTS

EP  0 455 160  11/1991

OTHER PUBLICATIONS

Wickstrom, Timothy K., "Microphones for Multimedia Speech Applications," Knowles Electronics, Inc., Itasca, IL.

* cited by examiner

Primary Examiner—Forester W. Isen
Assistant Examiner—Brian Pendleton
(74) Attorney, Agent, or Firm—Burns, Doane, Swecker & Mathis LLP

(57) ABSTRACT

A system for controlling noise for a sound receiving device directs noise towards the sound-receiving back side of a bi-directional microphone and directs the user's voice away from the back side. The bi-directional microphone is electrically connected to plug adapted for mating with an external microphone input jack of the sound receiving device. A resistor is connected in series with the bi-directional microphone and operates to attenuate the detected sound signal of the bi-directional microphone in order to overcome signal enhancement expedients of the sound receiving device, such as compression and clipping due to for example automatic gain control.

11 Claims, 5 Drawing Sheets

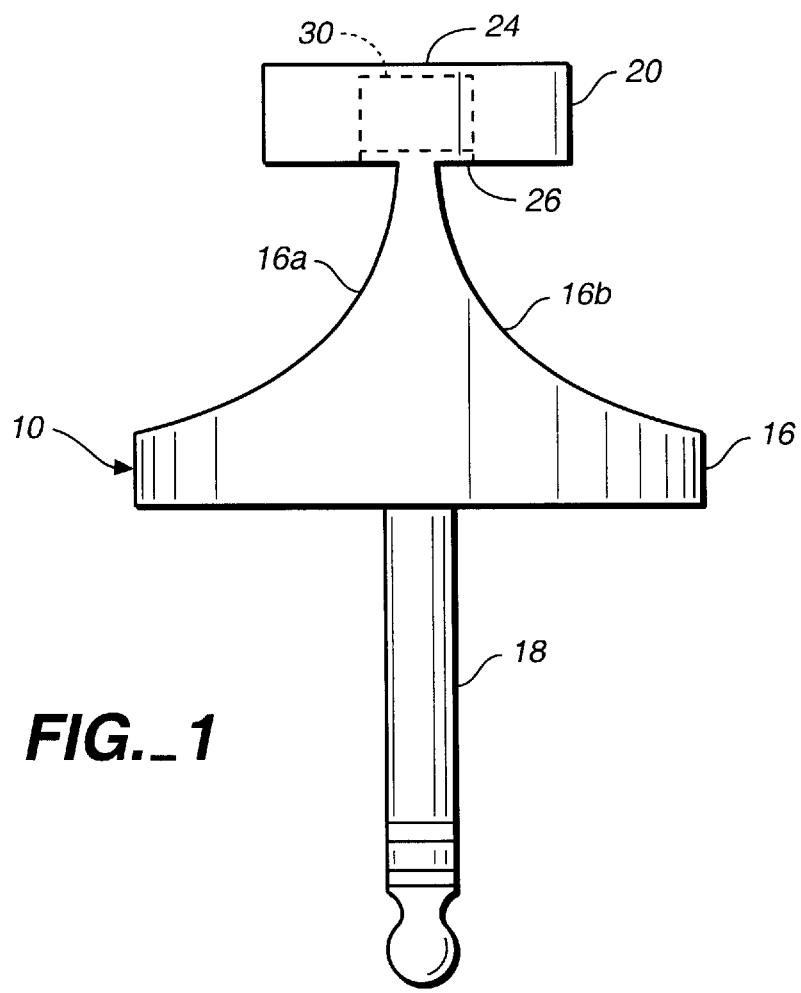
FIG._1
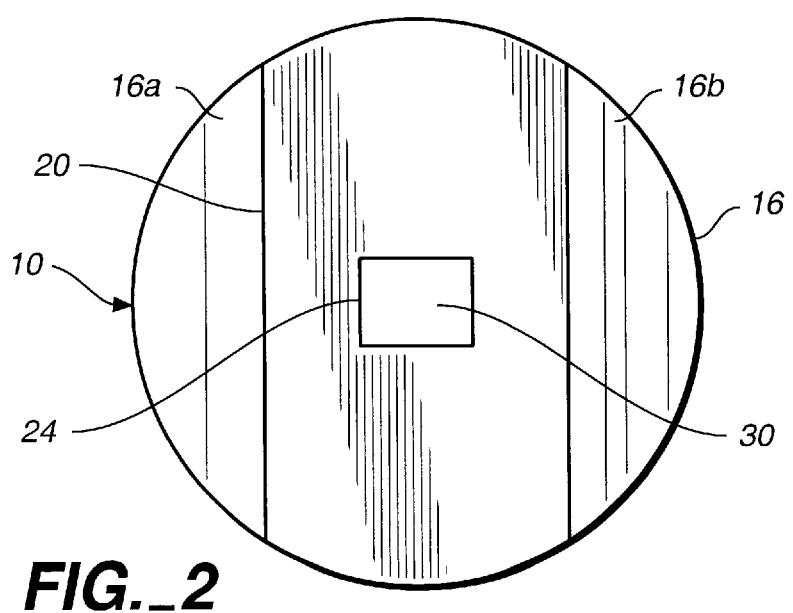
FIG._2

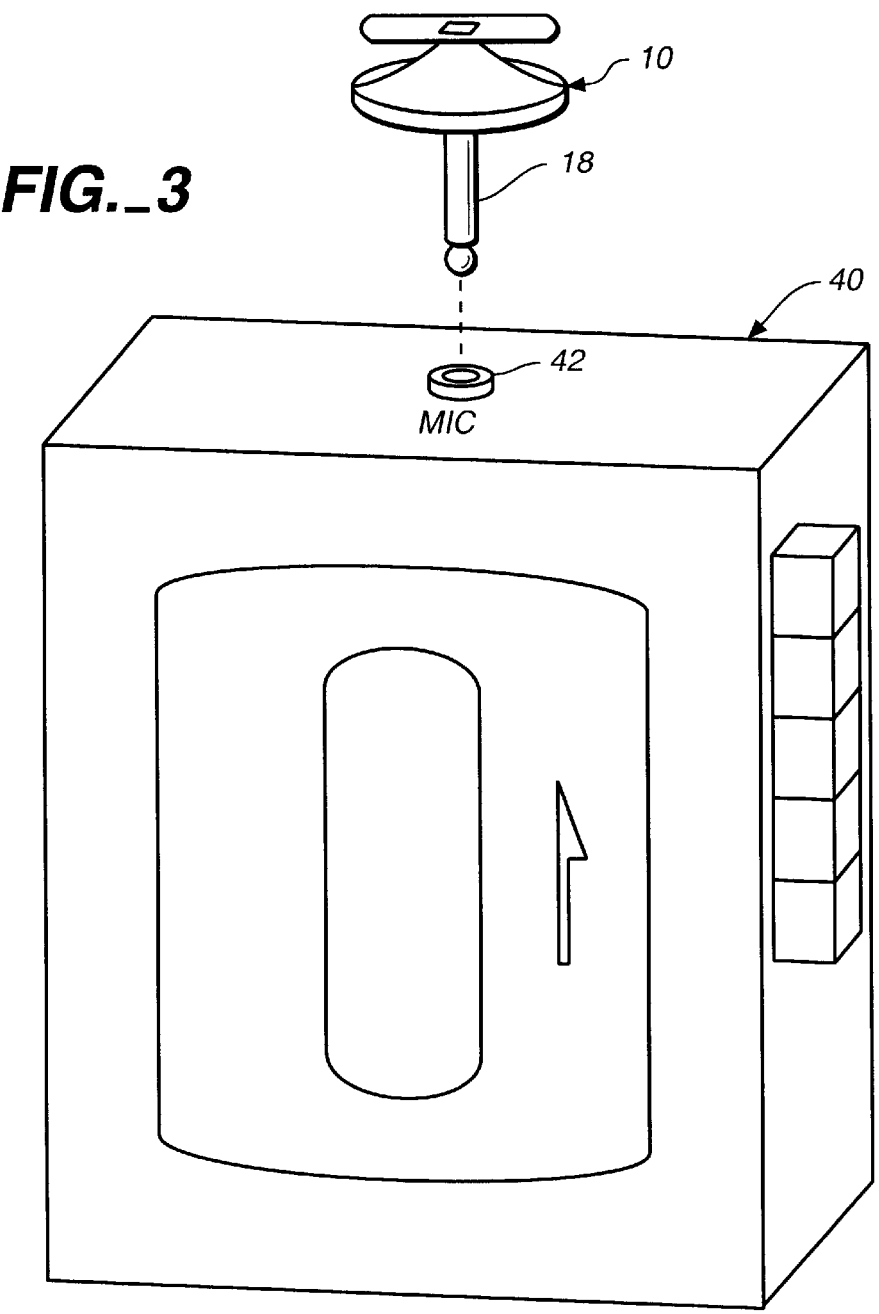
FIG._3
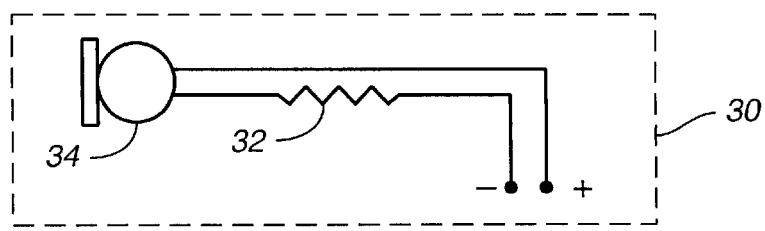
FIG._4

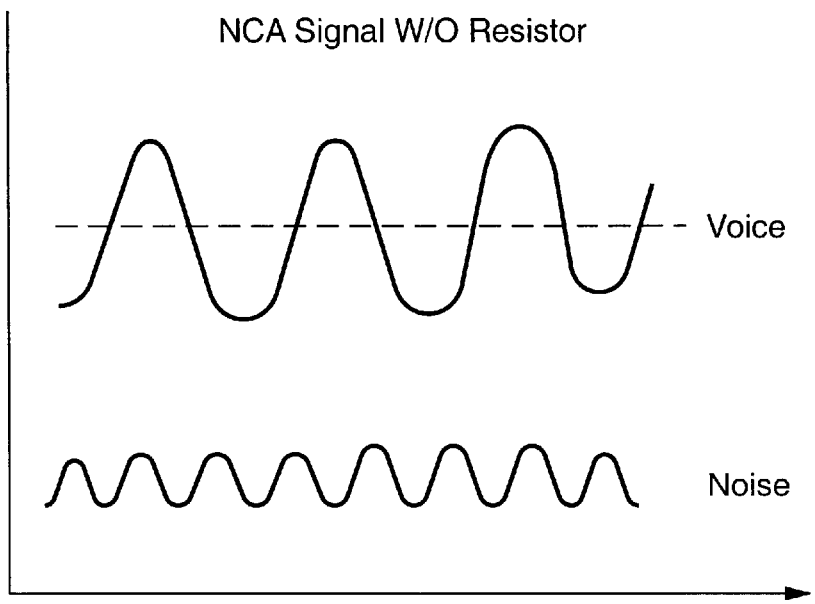
FIG._5A
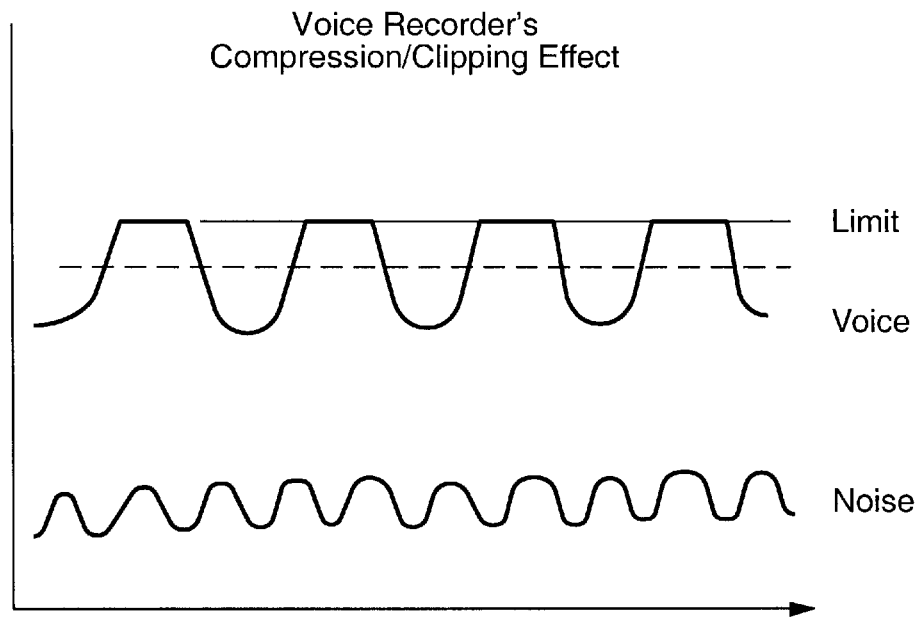
FIG._5B

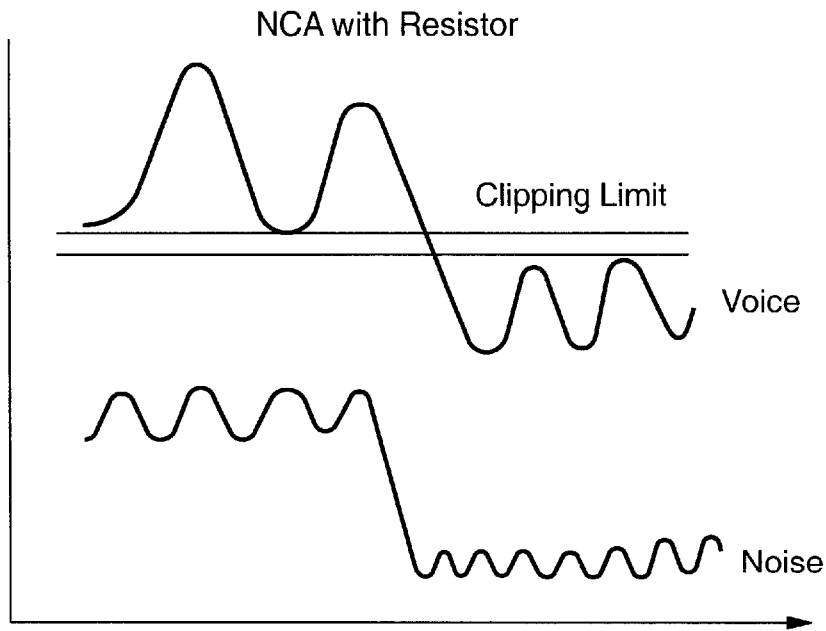
FIG._5C
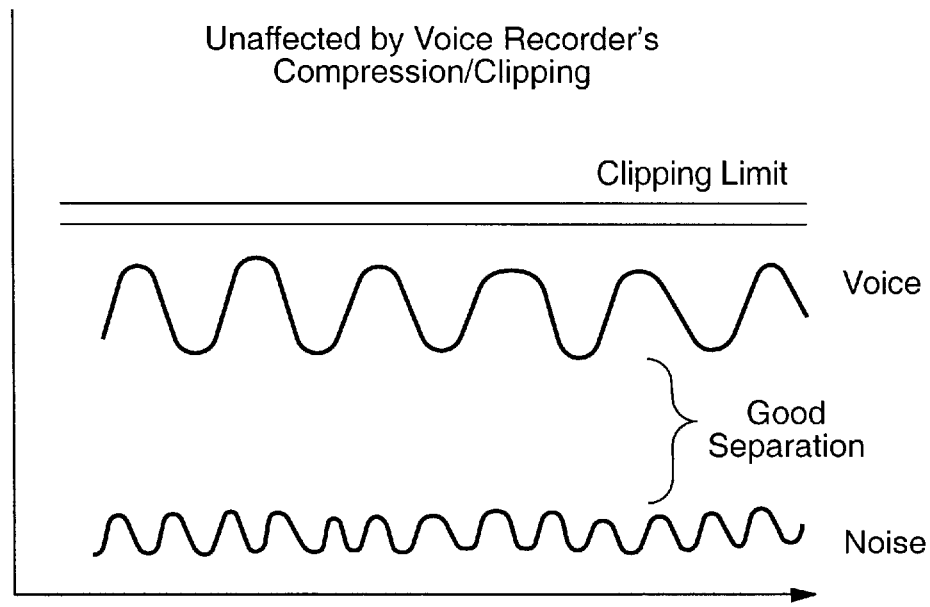
FIG._5D

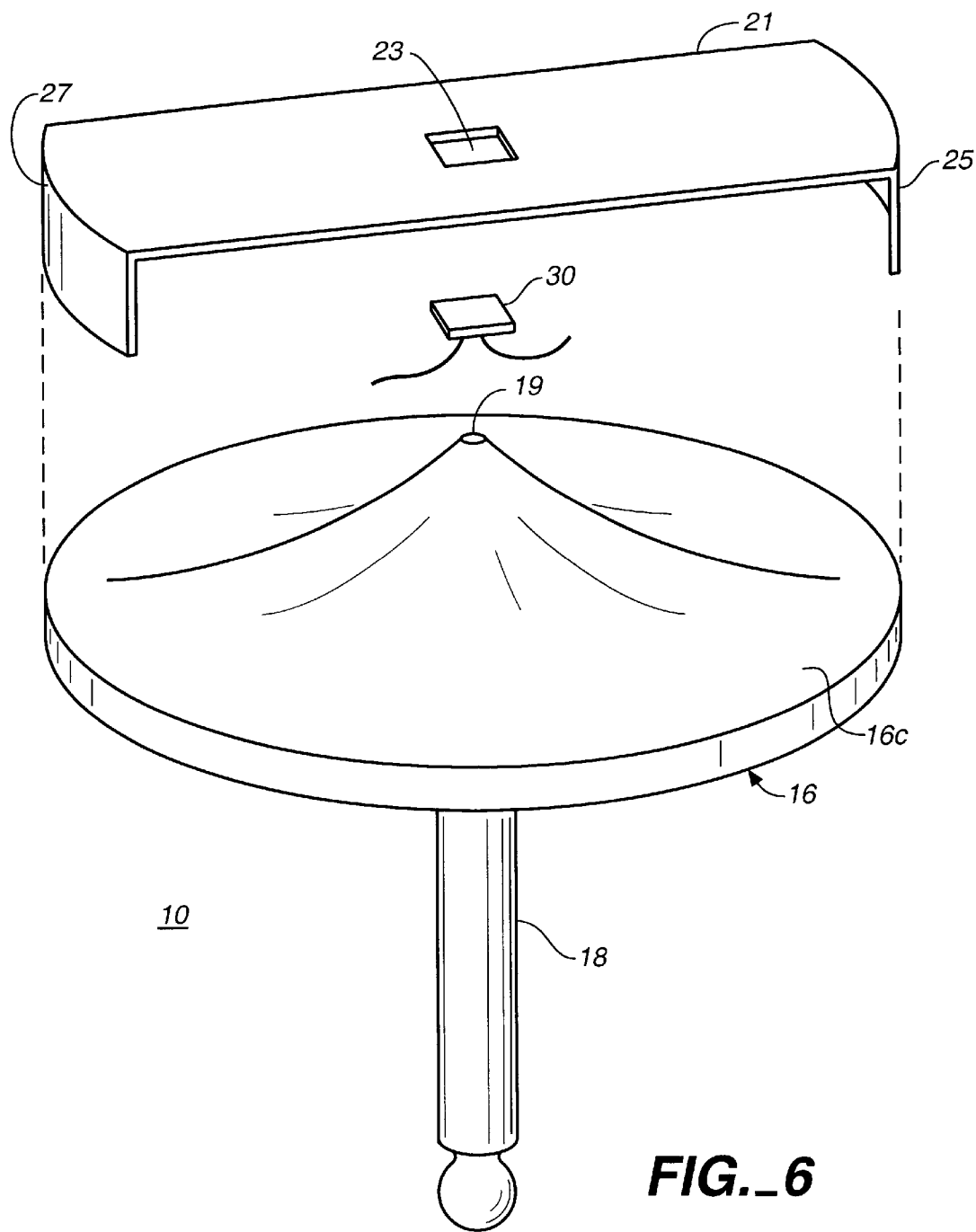
FIG._6

PLUGGABLE NOISE-CONTROLLING APPARATUS AND METHOD

CROSS-REFERENCE TO RELATED APPLICATIONS (Not applicable)

BACKGROUND OF THE INVENTION

1. Field of the Invention

The invention relates to electronic devices which use microphones to convert sound signals to electrical signals.

2. Description of Related Art

Microphone units typically operate in environments where unwanted noise is present. For example, a person listening to someone talking on the telephone may be distracted from the speaker's voice by sounds emanating from machinery, traffic, appliances, or other ambient sounds, if the person is talking into a phone without a noise-cancelling microphone.

Many noise-cancelling microphone element designs employ front and rear sound ports which allow sound to enter both and impinge upon the diaphragm simultaneously in opposite directions resulting in little r no signal being generated by the microphone. This technique is applied in a wide variety of cardioid microphones as well as telephone handset transmitters and headsets. Some employ acoustic tuning to the rear port to make it more frequency responsive.

Noise-cancelling microphones depend upon two factors for their operation. The first factor is the polar pattern of the microphone (usually bi-directional) and the assumption that the noise to be reduced is not on the maximum sensitivity axis of the microphone. The second factor is the different responses of the bi-directional microphone for a sound source close to the microphone (i.e., entering the front sound port) and a sound source at a distance to the microphone (i.e., entering the front and rear sound port).

When the sound source is close o the front sound port of the microphone, the sound pressure will be several times greater at the front than at the rear. Since the microphone responds to the difference of sound pressure at the two entries, close talking will provide a substantially higher sensitivity than a remote sound, where the sound pressure is equal in magnitude at the two entries.

Because of construction restraints inherent in front and rear sound port microphone design, one port of the microphone is always more sensitive. This results from the need to provide a supporting structure for the diaphragm and the resulting impedance that structure presents to sound entering the rear sound port microphone element. In common practice, the more sensitive port is faced forward to capture the desired sound while the less sensitive port is utilized for capturing and nulling the undesired background noises.

If the front and back sensitivities of the element were equal, then theoretically 100% noise rejection would be possible whenever noise of equal pressure is subjected to both entrances to the microphone. In practice however, only 10–20 dB noise reduction is possible using the currently available microphone elements and this is only for frequencies below about 3 KHz.

Frequency response is another factor that differentiates noise-cancelling microphones. Frequency response is essentially flat in the near field (i.e., a sound source close to the front sound port) over the audio band. In the far field (i.e., a remote sound source), the frequency response increases with frequency until the pressures at the front and rear ports of the unit are 180 degrees out of phase at which point resonance occurs. At some frequency, the microphone becomes more sensitive to axial far field sounds than axial near field sounds. This crossover frequency will occur at a higher frequency for a microphone with a shorter port separation than a microphone with a longer port separation.

Several devices, both electrical and mechanical, used for noise-cancellation exist but have potential drawbacks such as the need for preprocessing, effects of reflections, calibration difficulties, cost, and operating environment. For example, in environments in which human speech is the ambient noise, signal processing techniques such as filtering can not effectively be used because the ambient human speech is at the same frequency as the desired speaker's voice and because the ambient noise is non-constant or non-periodic.

U.S. Pat. No. 5,854,848 to Tate, et al., assigned to the same assignee of record and incorporated by reference herein in its entirety teaches the use of a specific deflector configuration to mechanically direct sound to a differential microphone (that is, a bi-directional microphone). The system of the '848 patent enhances the performance of pressure differential microphones used to cancel or reject background noise. When a pressure differential microphone and deflectors of the '848 patent are used together they form an electroacoustic noise rejection system exceeding the performance of other commercially available technologies.

The system of the '848 patent effects a high degree of cancellation of the impingement of ambient noise upon the front surface of a pressure differential microphone by directing the same ambient noise upon the back side of the microphone. The system of '848 patent causes ambient noise (including voice, non-constant noise, non-periodic noise, and random noise) to enter the microphone on both sides simultaneously and with the strength of the sound on the back side relatively higher slightly to overcome the relatively higher impedance of the back side of the microphone, thus nullifying the effect of the noise sound waves. Furthermore, the system of the '848 patent deflects the talker's voice (i.e., tie desired sound to be transmitted) away from the back side of the microphone.

The system of the '848 patent utilizes curved reflectors to direct ambient noise into the back side of the microphone even when the rear port of the microphone is not aligned with the source of greatest ambient noise. In addition, the sound pressure of the ambient noise entering the back side of the microphone is increased by the curved reflectors being larger than the opening leading to the back side of the microphone. By such a configuration, ambient noise sound waves entering the front of the microphone are cancelled at the microphone by the same ambient noise converging upon the back surface of the microphone. The curved reflectors also act to deflect the speaking voice away from the back side of the microphone so that the speaker's voice enters the front side of the microphone only. This is essentially to prevent self-cancellation.

In one aspect, the system of the '848 patent provides a noise-controlling apparatus for use with a directional microphone having a housing having a first sound opening located in a front side of a barrier element and a second sound opening located in a back side of the barrier element. The housing having a curved reflector extending from the back side of the barrier element which deflects a user's voice away from the second sound opening and deflects ambient noise toward the second sound opening.

In another aspect, the system of the '848 patent provides a noise-controlling apparatus having a microphone having both a sound-receiving front side and a sound-receiving back side. The housing having a centrally located barrier element with a first sound opening in a front side of the barrier element and a second sound opening in a back side of the barrier element communicating with the sound-receiving front and back side, respectively, of the microphone. The housing having a first curved reflector and a second curved reflector each extending from the back side of the barrier element and which deflect a user's voice away front the second sound opening and ambient noise toward the second sound opening.

In yet another aspect, the system of the '848 patent provides a noise-controlling apparatus having a microphone having a sound-receiving front side and a sound-receiving back side. The housing having a centrally located barrier element with a first sound opening in a front side of the barrier element and a second sound opening in a back side of the barrier element communicating with the sound-receiving front and back side, respectively, of the microphone and portions for deflecting a user's voice away from the second sound opening and deflecting ambient noise toward the second sound opening.

The system of the '848 patent efficiently controls ambient noise and improves microphone performance. When built into conventional electronic sound receiving devices and coupled with the electronic circuitry thereof, device performance is greatly enhanced in a relatively simple and inexpensive manner. However, it would be desirable to apply the same technology to existing electronic devices, the system of the '848 patent being provided as an add-on apparatus which can be pluggably coupled to a sound receiving device to thereby improve its sound detection characteristic without adding appreciably to its cost and without necessitating re-wiring or other modification of the existing device.

BRIEF SUMMARY OF THE INVENTION

In accordance with the present invention, noise control for a sound receiving device is effected using a system which pluggably mates with the sound receiving device. The system provides a bi-directional microphone having front and back sound-receiving sides. Ambient noise is directed toward the back side and a user's voice is directed away from the back side using a curved deflector. The user's voice is also directed away from the back side using a shield element.

Further in accordance with the invention, the system provides a plug which mates with an external microphone input jack of the sound receiving device. The plug establishes electrical contact between the noise control system and the sound receiving device. A resistor for attenuating the signal detected by the bi-directional microphone in order to overcome the effect of signal enhancement expedients of the sound receiving device is connected in series with the bi-directional microphone.

BRIEF DESCRIPTION OF THE SEVERAL VIEWS OF THE DRAWING(S)

Many advantages of the present invention will be apparent to those skilled in the art with a reading of this specification conjunction with the attached drawings, wherein like reference numerals are applied to like elements and wherein:

FIG. 1 is a side elevational view of an exemplary noise-controlling apparatus in accordance with the invention;

FIG. 2 is a top plan view of the noise-controlling apparatus of FIG. 1;

FIG. 3 is a schematic view illustrating the exemplary use of the invention with a voice recording device;

FIG. 4 is a schematic view of an exemplary electrical configuration of a microphone unit in accordance with the invention;

FIGS. 5A–5D are graphical representations illustrating the operation of the noise-controlling apparatus in accordance with the invention, with FIG. 5A showing a comparison of the noise control signal without a resistor, FIG. 5B showing the effects of the clipping due to a signal enhancement expedient, FIG. 5C showing the effects of the use of a resistor on the noise-controlling apparatus in accordance with the invention, and FIG. 5D showing the advantages in overcoming compression and clipping effects of the voice recording device; and FIG. 6 is an exploded view of a second exemplary noise-controlling apparatus in accordance with the invention.

DETAILED DESCRIPTION OF THE INVENTION

FIGS. 1 and 2 show an exemplary arrangement of a pluggable noise-controlling apparatus in accordance with the invention. Noise-controlling apparatus 10 comprises microphone unit 30 having a having a bidirectional microphone, and may also contain supporting circuitry, as discussed below Unit 30 is mounted in fixed relation with a barrier element 20 and a deflector 16. The bi-directional microphone is disposed in unit 30 such that a sound-receiving back side thereof faces deflector 16, through an opening 26, and a sound-receiving front side the of faces away from deflector 16, through an opening 24. A plug 18 is in electrical communication with the microphone unit 30, through for example cables or other electrical conductors (not shown).

Acoustically and mechanically, noise-controlling apparatus 10 is designed to operate in the same manner as the '848 system discussed above and incorporated herein by reference in its entirely. Noise-controlling apparatus 10 directs ambient noise (including voice, non-constant noise, non-periodic noise, and random noise) toward the back side of the bi-directional microphone of the unit 30 and by directing a user's voice away from the sound-receiving back side. The directing of the sound is effected by the two curved surfaces 16a and 16b of deflector 16 and by barrier element 20. Specifically, deflector 16 serves to direct the ambient noise towards the back side of the microphone and the user's voice away from the back side, while the barrier element 20 primarily deflects the user's voice away from the back side. Surfaces 16a and 16b converge at a line which offers an edge for support of barrier element 20 in confronting relationship to deflector 16. The curvature of surfaces 16a and 16b does not have to conform to a simple mathematical equation and can be semi-parabolic, quasi-parabolic, or any of a large variety of variable curved surfaces.

As shown in FIG. 3, apparatus 10 is adapted to pluggably mate with a sound receiving device such as voice recorder 40, for example a Sony™ voice recorder. As such, plug 18 serves to matingly fit into: an external microphone input jack 42 provided on the voice recorder device 40. The size and configuration of plug 18 is selected for the particular device with which apparatus 10 is intended to operate, and specifically depends on the physical and electrical configuration of the input jack of the device.

It will be appreciated that sound receiving devices such as voice recorder 40 may contain signal enhancement expedients such as automatic gain control circuitry. When used in conjunction with devices provided with such expedients, compensation for the effects of the expedients may be necessary. Accordingly, the noise-controlling apparatus 10 may be provided with a resistor 32 connected in series with the bi-directional microphone 34, as shown schematically in FIG. 4. Microphone 34 generates electrical signals in response to detected sound, and these signals are attenuated by resistor 32. Preferably, the resistor 32 is disposed in microphone unit 30 as part of the circuit of the microphone unit, which may comprise an IC (integrated circuit) chip.

With reference to FIGS. 5A–5D, the operation of the resistor 32 can be more clearly explained. In FIG. 5A, the signal from a noise-controlling apparatus (NCA) is depicted for both voice and noise, using representative curves to show the relative strength of the voice and noise signals. Resistor 32 is omitted from the apparatus whose signal is depicted in FIG. 5A.

FIG. 5B shows the effect of clipping, due to electronic signal enhancement expedients such as an automatic gain control circuit provided in the sound receiving device(voice recorder) with which apparatus 10 is intended operate. It can be seen from FIG. 5B that the clipping of the voice signal results in a poor ratio and separation level between the voice and noise signals.

The effect of adding a resistor 32 to the noise-controlling apparatus 10 of the invention is shown in FIG. 5C. The resistor 32 attenuates both the voice and noise signals, bringing down both the voice and noise strengths while maintaining the good ratio and separation. In FIG. 5D the effect of this attenuation is more clearly illustrated, showing that the signals, due to the attenuation, become immune to clipping.

It will be appreciated that the exact value of the resistor 32 will depend on the application contemplated. Specifically, the resistance value will depend upon the characteristics of the signal enhancement expedient deployed by the sound receiving apparatus. For instance, when noise-controlling apparatus 10 is to be used with Sony™ voice recorder, a preferred resistance value is about 20 kilo ohms.

It will also be appreciated that the noise-controlling apparatus 10 can assume various different shapes. FIG. 6 shows a second arrangement of the apparatus 10, wherein like numerals are used to designate like components. The primary difference between the FIGS. 1 and 2 arrangement and the FIG. 6 arrangement is in the shape of the deflector component. Rather than having two semi-circular curved halves 16a and 16b converging at a line, in FIG. 6 the deflector 16 is shown has having a single, circular curved surface 16c which tapers to a point 19, with microphone unit 30 being disposed in confronting relation to that point. Unit 30 is mounted in hole 23 in barrier element 21, which is supported at one end by a flange 25 and at the other end by a flange 27. Other means of support are also contemplated.

The above are exemplary modes of carrying out the invention and are not intended to be limiting. It will be apparent to one of ordinary skill in the art that modifications thereto can be made without inventive departure from the spirit and scope of the invention as set forth in the following claims.

What is claimed is:

1. A noise-controlling apparatus adapted for operation with a sound receiving device having a microphone jack for electrically connecting the sound receiving device to an external microphone, the noise-controlling apparatus comprising:

a microphone having a sound-receiving front side and a sound-receiving back side;

a reflector for deflecting a user's voice away from the back side and for deflecting ambient noise toward the back side;

a barrier element for deflecting the user's voice away from the back side; and a plug for pluggably mating with he microphone jack to thereby electrically connect the microphone with the sound receiving device.

2. The noise-controlling apparatus of claim 1, further comprising a resistor connected in series between the microphone and the plug.

3. The noise-controlling apparatus of claim 1, wherein the sound receiving device is a voice recorder.

4. The noise-controlling apparatus of claim 3, further comprising a resistor connected in series between the microphone and the plug.

5. The noise-controlling apparatus of claim 4, wherein the resistor value is about 20 kilo ohms.

6. A method of controlling noise detected by a sound receiving device, the method comprising:

using a bi-directional microphone having sound-receiving front and back sides to generate electrical signals representative of detected sound;

deflecting a user's voice away from the back side;

deflecting ambient noise toward tile back side;

attenuating the electrical signals; and providing the attenuated electrical signals to the sound receiving device.

7. The method of claim 6, wherein step of providing comprises pluggably mating the microphone to a jack of the sound receiving device.

8. The method of claim 7, wherein the step of attenuating is effected using a resistor.

9. The method of claim 8, wherein the sound receiving device is a voice recorder.

10. The method of claim 9, in the value of the resistor is about 20 kilo ohms.

11. The method of claim 8, herein the value of the resistor is about 20 kilo ohms.

* * * * *